(12) United States Patent
Burdeshaw et al.

(10) Patent No.: US 11,199,228 B2
(45) Date of Patent: Dec. 14, 2021

(54) GRID COUPLING SEAL AND METHOD

(71) Applicant: ABB Schweiz AG, Baden (CH)

(72) Inventors: Galen Burdeshaw, Simpsonville, SC (US); Thomas Kuckhoff, Greenville, SC (US)

(73) Assignee: Dodge Acquisition Co., Oxford, CT (US)

( * ) Notice: Subject to any disclaimer, the term of this patent is extended or adjusted under 35 U.S.C. 154(b) by 751 days.

(21) Appl. No.: 16/026,281

(22) Filed: Jul. 3, 2018

(65) Prior Publication Data

US 2020/0011382 A1 Jan. 9, 2020

(51) Int. Cl.
*F16D 3/52* (2006.01)
*F16D 3/84* (2006.01)

(52) U.S. Cl.
CPC ............... *F16D 3/52* (2013.01); *F16D 3/843* (2013.01)

(58) Field of Classification Search
CPC ... F16D 3/52; F16D 3/84; F16D 3/843; F16D 3/848; F16D 2300/08; F16J 15/067; F16J 15/0818; F16J 15/0825; F16J 15/0831; F16J 15/10; F16J 15/102; F16J 15/104; F16J 15/106; F16J 15/54
USPC .............................. 464/52, 54, 87, 170, 177
See application file for complete search history.

(56) References Cited

U.S. PATENT DOCUMENTS

| | | | | |
|---|---|---|---|---|
| 1,216,227 A | * | 2/1917 | Grundy | F16D 3/52 464/54 |
| 1,391,713 A | * | 9/1921 | Bibby | F16D 3/52 464/54 |
| 1,763,842 A | * | 6/1930 | Bibby | F16D 3/52 464/54 |
| 2,027,842 A | * | 1/1936 | Schmitter | F16D 3/52 464/54 |
| 2,555,909 A | * | 6/1951 | Wellauer | F16D 3/52 464/54 |
| 2,643,529 A | * | 6/1953 | Thomas | F16D 3/52 464/54 |
| 2,885,871 A | * | 5/1959 | Wellauer | F16D 3/52 464/54 |
| 3,013,410 A | * | 12/1961 | Schmitter | F16D 3/52 464/54 |
| 3,079,773 A | * | 3/1963 | Schmitter | F16D 3/52 464/54 |
| 3,096,631 A | * | 7/1963 | Seireg | F16D 3/52 464/54 |
| 3,096,632 A | * | 7/1963 | Wellauer | F16D 3/52 464/54 |
| 3,124,943 A | * | 3/1964 | Schmitter | F16D 3/52 464/54 |
| 3,196,635 A | * | 7/1965 | Schmitter | F16D 3/52 464/54 |
| 3,246,483 A | * | 4/1966 | Schmitter | F16D 9/06 464/54 |

(Continued)

*Primary Examiner* — Josh Skroupa
(74) *Attorney, Agent, or Firm* — Murtha Cullina LLP (57) ABSTRACT

A system and method for replacing a sealing arrangement of a grid coupling without removing or disturbing a mechanical connection of the coupling with driver and driven shafts connected to the coupling includes providing combined seal members having gasket seal portions that are integrally formed with radial seal portions and that are disposed between portions of the housing and the rotating seal group of the grid coupling.

10 Claims, 7 Drawing Sheets

(56) References Cited

U.S. PATENT DOCUMENTS

| | | | | |
|---|---|---|---|---|
| 3,379,444 A * | 4/1968 | Brummer | F16J 15/3272 | |
| | | | 277/543 | |
| 4,044,572 A * | 8/1977 | Wellauer | F16D 3/52 | |
| | | | 464/54 | |
| 4,072,028 A * | 2/1978 | Connell | F16D 3/52 | |
| | | | 464/177 | |
| 4,413,980 A * | 11/1983 | Walloch | F16D 3/56 | |
| | | | 464/71 | |
| 4,881,921 A * | 11/1989 | Pokrandt | F16D 3/52 | |
| | | | 464/54 | |
| 4,925,431 A * | 5/1990 | Pokrandt | F16D 3/52 | |
| | | | 464/54 | |
| 5,121,932 A * | 6/1992 | Goldman | F16J 15/104 | |
| | | | 123/90.37 | |
| 6,454,275 B1 * | 9/2002 | Vick | F01M 11/0004 | |
| | | | 277/634 | |
| 9,151,330 B2 * | 10/2015 | Lessard | F16D 3/52 | |
| 9,939,067 B2 * | 4/2018 | Janian | F16J 15/3268 | |
| 2014/0138917 A1 * | 5/2014 | Sieff | F16J 15/067 | |
| | | | 277/313 | |
| 2017/0328416 A1 * | 11/2017 | Maw | F16D 3/52 | |

* cited by examiner

GRID COUPLING SEAL AND METHOD

TECHNICAL FIELD

This patent disclosure relates generally to grid couplings and, more particularly, to seals for grid coupling split covers.

BACKGROUND

Grid couplings are a known type of coupling used in applications such as rock and aggregate conveyors where both high torque levels and damping requirements are desired. Unlike other known coupling types, for example gear and disc couplings, grid couplings are uniquely configured to reduce vibration by as much as 30%, and to cushion shock loads, which protects and extends the life of driving and driven power transmission equipment.

A typical grid coupling includes two hubs, each having a series of teeth, which are installed in opposing relation. A grid spring element is meshed between the teeth to mechanically interconnect the two hubs. A cover, hereafter referred to as housing, is disposed around the grid spring to protect against contamination by debris and to enclose a lubricant that is used to lubricate the interfaces between the grid spring and the teeth.

One of the biggest, if not the biggest, limitation of grid couplings is their limited ability to accommodate misalignment. While great at damping vibration, grid couplings are not especially well configured to operate in the presence of parallel shaft misalignment that is more than a minimal angle, for example, about 0.5 degrees. Additionally, grid couplings require periodic cleaning and reapplication of lubrication, and replacement of seals and housing gaskets, which typically requires disassembly of the coupling and a laborious process to realign the coupling during reinstallation. For example, radial or O-ring seals disposed to seal a neck of each hub to the housing require removal of the hub for installation insofar as the seal is not sufficiently large to stretch over the teeth of the hub, which may also cut or otherwise damage the new seal during installation, and must be installed from the external end of the hub relative to the coupling. Reinstallation of the hubs onto the rotating shafts requires a careful realignment such that the parallel and angular shaft misalignment is within specifications, and is an especially time consuming process when a heated interference fit is used to couple the hubs onto the rotatable shafts.

SUMMARY

The disclosure describes, in one aspect, a grid coupling. The grid coupling includes two housing halves that are connectable to one another to form a housing having an internal cavity, and an opening disposed at each of a first axial end and a second axial end of the housing. A rotating group is at least partially disposed within the internal cavity and has two hubs rotatably engaged by a spring element to rotate about a rotational axis. Each of the two hubs has a cylindrical bearing surface that extends axially along at least a portion of each of the two hubs and along the rotational axis such that, when the grid coupling is assembled, the cylindrical bearing surface extends through the opening disposed at each of the first axial end and the second axial end. The rotating group is adapted for mechanical connection between a driver shaft and a driven shaft to transfer rotational motion between the driver and driven shafts.

In one embodiment, each of the two housing halves is generally saddle shaped and includes two flanges that are coplanar along a plane that extends parallel to the rotational axis from the first axial end to the second axial end. The two housing halves are connected to form the housing at the two flanges. Each of the two housing halves further includes a channel disposed at each of the first axial end and the second axial end, the channel extending peripherally around the opening at each of the first axial end and the second axial end, the channel being oriented perpendicularly to the rotational axis.

The grid coupling further includes two combined seal members, each of the two combined seal members comprising at least one gasket seal portion, and at least one radial seal portion. When the grid coupling is assembled, each of the two combined seal members is configured to be inserted around the rotating group while the rotating group remains connected between the driver and driven shafts and the housing is removed, such that, when the two housing halves are assembled around the rotating group and the two combined seal members, the internal cavity is sealed by at least one gasket seal portion from one of the two combined seals is disposed in sealing relation between two opposed flanges, and the at least one radial seal portion is disposed in the channel in sealing and sliding relation between the channel and the cylindrical bearing surface.

In another aspect, the disclosure describes a combined seal member for forming a seal between a rotating group and two housing halves of a grid coupling. The combined seal member includes a gasket seal portion, which is flat and extends along a plane that is parallel to a rotational axis of the grid coupling. The gasket seal portion is configured to provide a mechanical face seal between opposing flanges formed on the two housing halves. The gasket seal portion has an inner end, which is closer to the rotational axis than an outer end, and first and second axial ends. The combined seal member further includes two radial seal portions, each having a U-shape and being connected at one end to the first or second axial ends of the gasket seal portion. The two radial seal portions extend in parallel to one another and along respective planes that are perpendicular to the rotational axis. When the grid coupling is assembled, the gasket seal portion is disposed between the opposing flanges of the two housing halves, and the two radial seal portions are disposed in sealing and sliding relation between a housing and cylindrical bearing surfaces of the rotating group.

In yet another aspect, the disclosure describes a method for replacing seals in a grid coupling. The method includes providing a grid coupling in an assembled position between two rotating machine components. While a rotating group of the grid coupling remains connected between the rotating machine components, the method further includes removing a housing from around the rotating group of the grid coupling, removing existing seals of the grid coupling disposed between the rotating group and the housing, inserting two seal elements around the rotating group, each of the two seal elements including a gasket portion and two radial seal portions, and assembling the housing around the rotating group and the two seal elements such that the two radial seal portions are disposed in sliding and sealing relation between the housing and the rotating group and the gasket portion creates a mechanical face seal between flanges of two halves of the housing. The method also includes securing the two halves of the housing together to form the housing.

DETAILED DESCRIPTION

This disclosure relates to mechanical couplings and, more specifically, to grid couplings such as the couplings used to transfer rotational motion in an industrial process, for example, a conveyor system. Known grid couplings typically include two hubs that are interconnected by a resilient or spring element. Relative motion of the hubs, especially when transferring impact or sudden loads, can be damped by the resilient or spring element that connects the couplings. During operation, rubbing and friction within the coupling, which can be detrimental to the operation and longevity of the coupling, can be alleviated by clean useable lubricant. Any damage to the seal or gasket during installation can jeopardize the life of the lubricant and therefore the life of the coupling. To maintain the lubricant in place within the coupling, and to avoid contamination of the working surfaces and components of the coupling, a housing encloses the moving parts of the coupling. The housings belong in two major varieties, which are horizontally and vertically separating housings. In the present disclosure, the exemplary embodiment shows a horizontally separating housing arrangement, i.e., a housing that separates along a plane that is parallel to the rotational axis of the coupling, but it should be appreciated that the devices and methods described herein may be applicable to vertically separating housings as well, i.e., housings in which the plane of separation between two housing halves is perpendicular to the rotation axis of the coupling.

Figure 1:
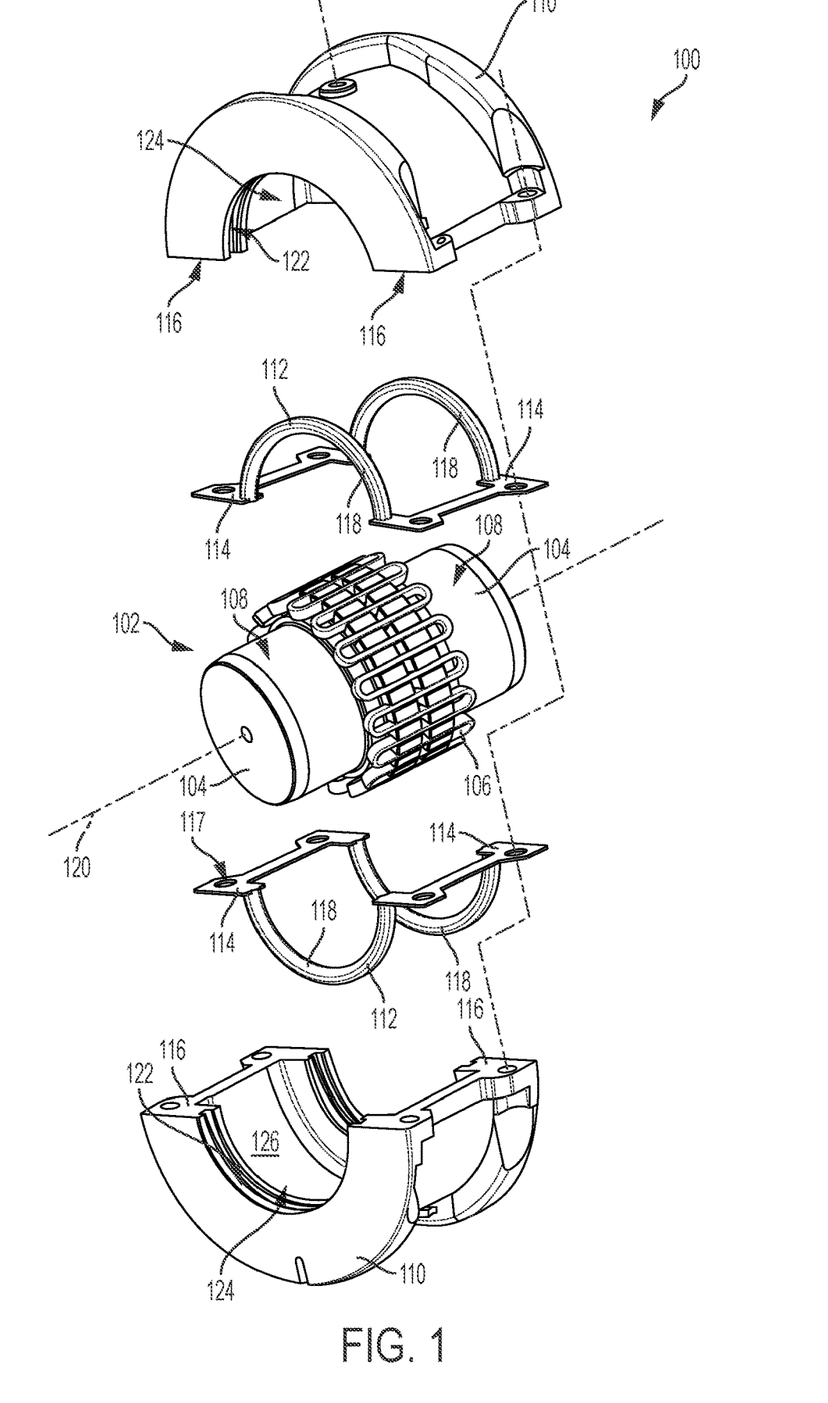
FIG. 1 is an exploded view of a grid coupling in accordance with the disclosure.

An exploded view of a coupling 100 in accordance with the disclosure is shown in FIG. 1 to reveal the main components thereof. These main components are also shown removed from the coupling in FIGS. 2-5. In reference to these figures, the coupling 100 includes a rotating group 102 that is made up from two hubs 104 that are connected by a spring 106 in the typical fashion. The spring 106 shown in the illustrated embodiment is illustrative and not limiting to the various types of springs that can be used in grid couplings, for example, springs having tapered or straight cross sections and the like. The rotating group 102 has two cylindrical bearing surfaces 108, one on each hub 104, which generally slidably and sealably engage a housing made from two housing halves 110. During operation, inertia effects between the rotating group 102 and the housing 110, as well as relative motion between portions of the rotating group 102, may cause sliding between the housing and the bearing surfaces 108.

Figure 4:
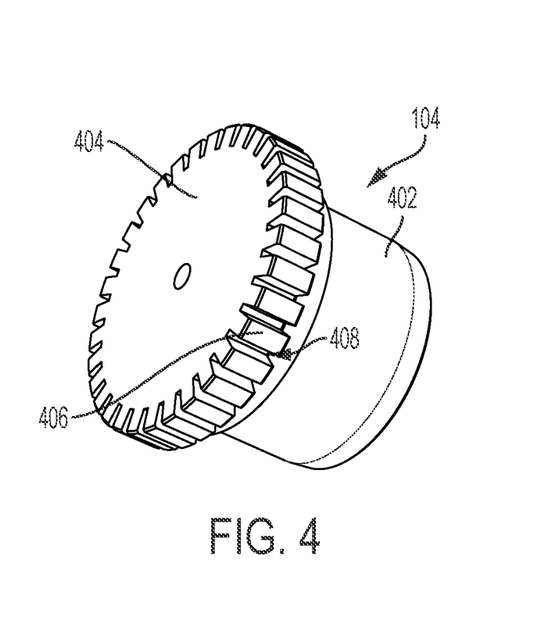
FIG. 4 is a hub for a grid coupling in accordance with the disclosure.
Figure 5:
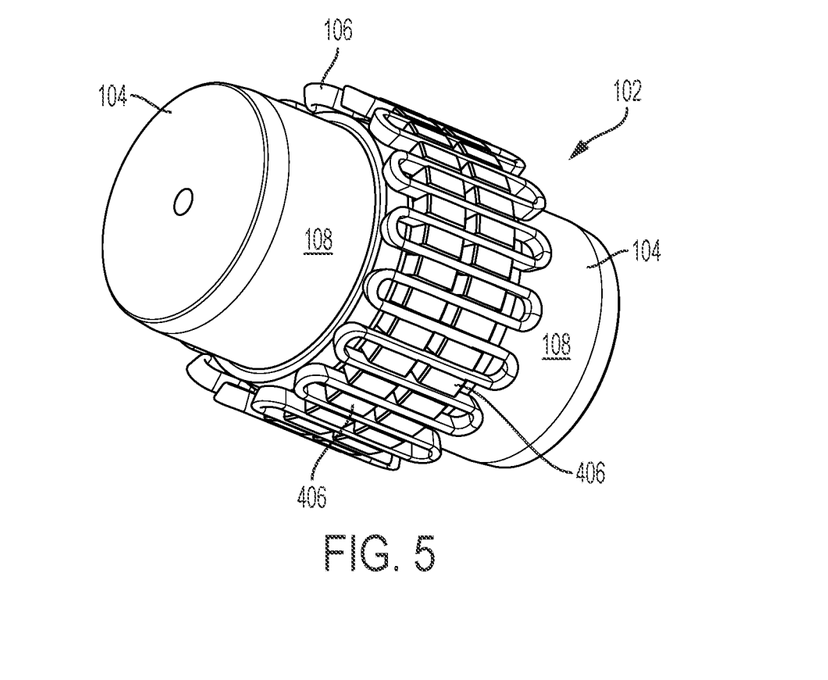
FIG. 5 is an inner group assembly for a grid coupling in accordance with the disclosure.

Each hub 104, as is also shown in FIGS. 4 and 5, includes an axle portion 402 that has a generally cylindrical shape and may include features such as a central opening (not shown), keyways or key slots (not shown) or other structures that permit a mechanical connection of the hub to other rotating machine components. The axle portion 402 is connected to a flange 404, which extends radially outwardly with respect to an outer diameter of the axle portion 402 and which is disposed towards an inner end of the hub 104 in its orientation relative to the coupling.

The flange 404 includes a series of teeth 406 that are separated by slots 408 arranged in alternating fashion around the entire outer periphery of the flange 404. When the rotating group is assembled, as shown in FIG. 5, axially extending portions 302 of the spring 106 are disposed within the slots 408. The axially extending portions 302 are connected by bent portions 304. One of the bend portions includes a slit or opening 306, which permits the spring 106 to open for assembly around the flanges 404 of two hubs that, together, make up the rotating group 102.

Turning now to the housing, each of the two housing halves 110 has a generally C-shaped cross sectional shape such that, when the two halves are connected, a hollow cylindrical housing is assembled around the center of the rotating group 102. Sealing of an interior portion of the housing is accomplished by two combined seal members 112. Each combined seal member 112 is arranged to provide a face seal at some portions, and a radial seal at other portions, as described below.

Figure 6:
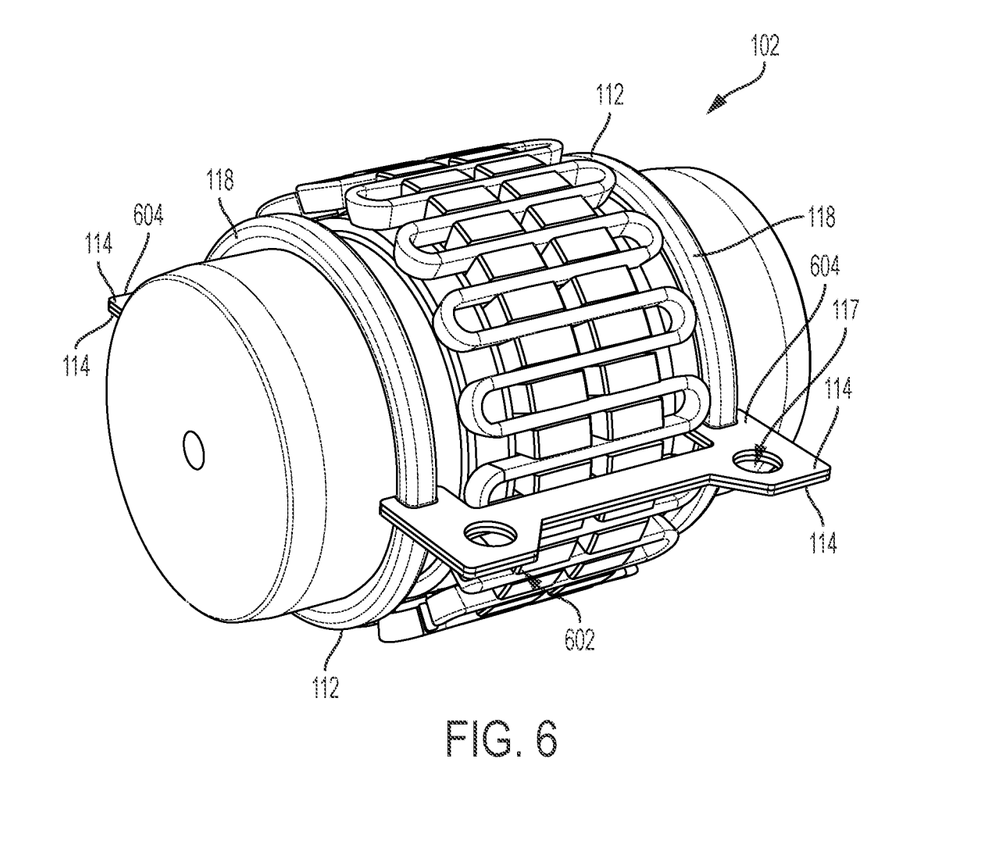
FIG. 6 is an outline view of the inner group assembly of FIG. 5 with seals installed thereon in accordance with the disclosure.

More specifically, and in further reference to FIG. 6, each seal member 112 includes two gasket portions 114 disposed at either end of each seal member. In one embodiment, it is contemplated that a single gasket portion 114 can also be used. When the coupling 100 is assembled, each gasket portion 114 is disposed to create a face seal along a surface 602 between two mating gasket portions 114 from two seal members 112 assembled around the rotating group 102. Along their outer-facing surfaces 604, each gasket portion is arranged to matingly engage a flange 116 (FIG. 2) of the respective housing half 110. Each gasket portion 114 further includes two openings 117, which accommodate fasteners (not shown) that connect the two housing halves 110 to one another.

Each seal member 112 further includes two U-shaped radial seal portions 118 disposed at either axial end of the member relative to a rotation axis 120 of the coupling 100. The radial seal portions 118 are configured to fit within channels 122 that extend peripherally around half-circle openings 124 disposed at each axial end of each of the two housing halves 110. When disposed within the channels 122 of an assembled housing 110 around the rotating group 102, the radial seal portions 118 slidably and sealably engage the bearing surfaces 108 to create a radial seal. This radial seal, along with the face seals provided by the gasket portions 114, and the remaining radial seals, provide a complete seal around an internal cavity 126 of the housing that contains the spring 106 and surrounding structures of the hubs 104, which are typically also lubricated.

Figure 7:
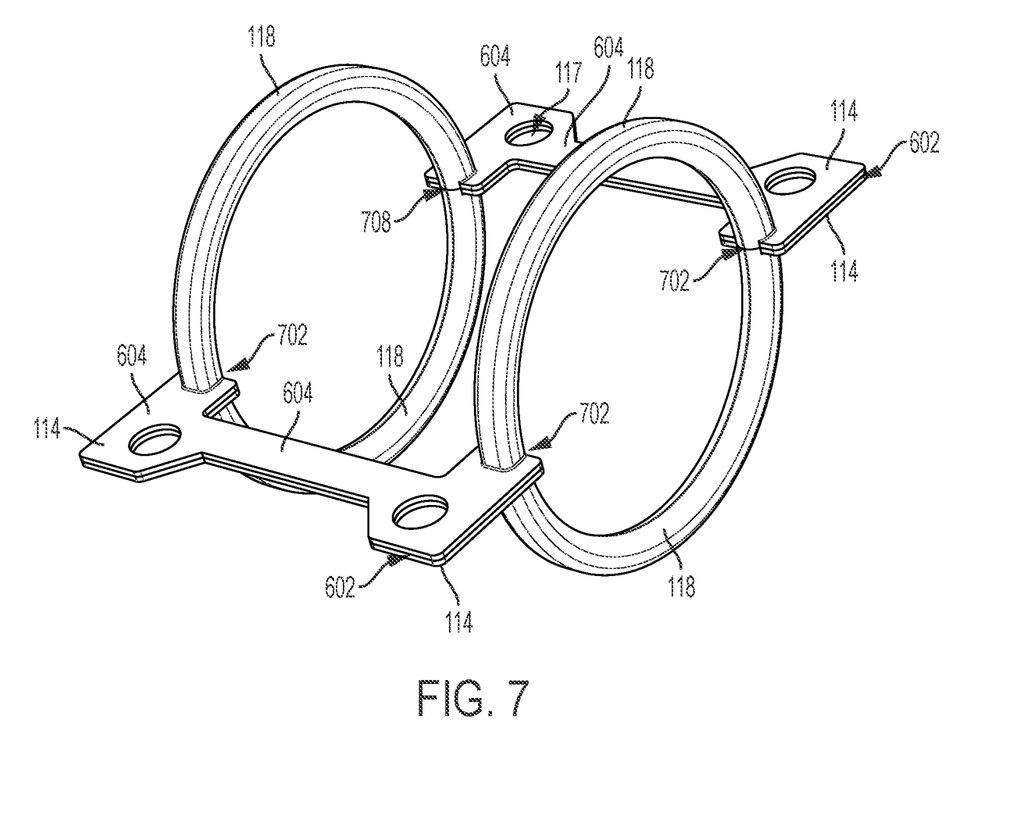
FIG. 7 is an outline view of the seals shown in FIG. 6 but removed from the grid coupling for illustration.
Figure 8:
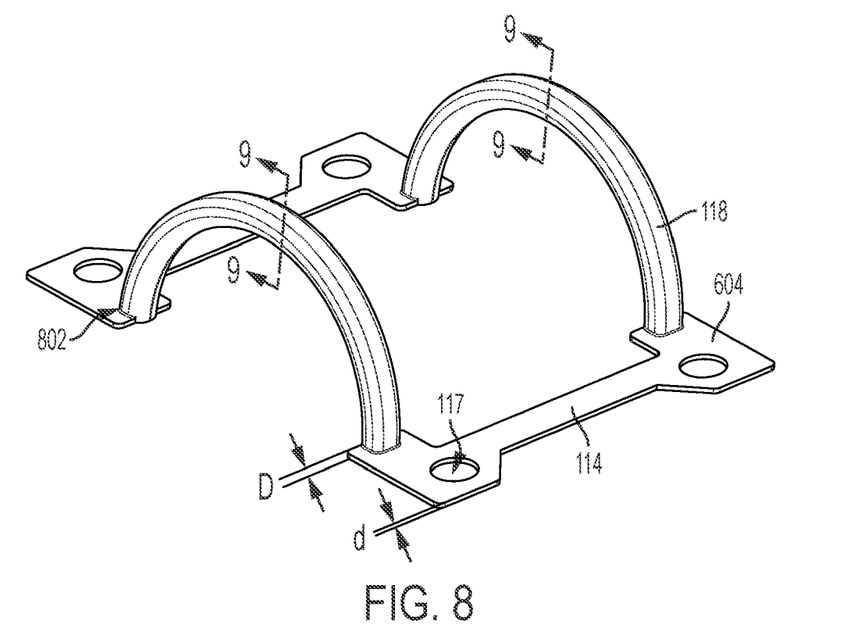
FIG. 8 is an outline view of a seal in accordance with the disclosure.
Figure 9:
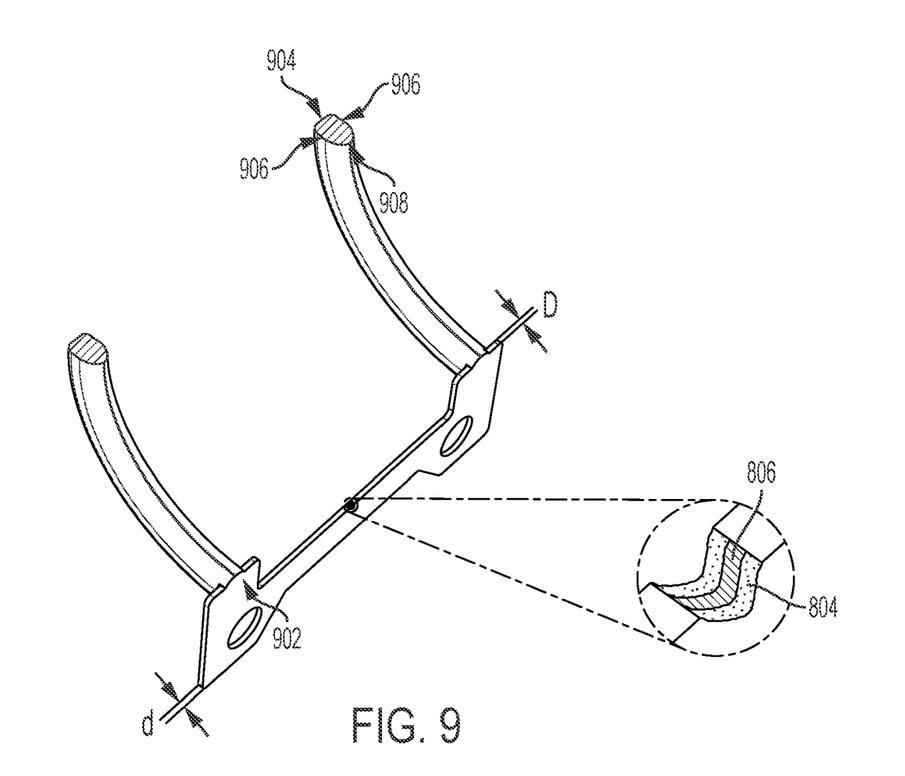
FIG. 9 is a sectional view of the seal of FIG. 8.

The two seal members 112 in mating relation are shown removed from the coupling 100 in FIG. 7. FIGS. 8 and 9 show a seal member 112 and a cross section thereof. In reference to these figures, it can be seen that the two seal members 112 are in direct contact with one another along the gasket portions 114, which seal against each other along the surface 602, and also along radial contact surfaces 702 (four total) formed between the blunt or exposed diametrically opposite ends 902 (FIG. 9) of the radial seal portions 118. In an embodiment where a single gasket portion 114 is used per seal member 112, a single layer gasket can provide the face seal between the mating housing flanges 116.

To ensure that a proper seal is created both around the bearing surfaces 108 of the rotating group 102, between the flanges 116 of the housing halves 110, and also at the transition or junction areas 802 (FIG. 8) between the gasket portions 114 and the radial seal portions 118, additional material may be provided in certain areas or sections of the seal members 112. More specifically, the seal members 112 may be made primarily from an elastomeric material, which possesses a desired resilience and also resistance to temperature, debris and chemicals, as those might be encountered during service in any environment. One possible material is rubber, while others include fluoro-elastomers such as Viton®, which may further have lubrication coatings deposited thereon. For comparison, known sealing arrangements for grid couplings of this type include gaskets made from cardboard and rubber O-ring seals that require disassembly of the hubs from the respective axles they are connected to during assembly of the coupling. In one embodiment, the gasket portions 114 are made by overmolding an elastomeric layer 804 on one or both sides of a grid structure or substrate 806, as shown in the enlarged detailed section of FIG. 9. In another embodiment, the seal members 112 may be bonded or overmolded directly onto the housing halves 110.

Returning now to the gasket portions 114, the area of the surface 602, which is radially inward, and which also includes the blunt ends 902 along an inner end of the flange, is made to be thicker than the corresponding area of the surface 602 that is radially outward along an outer end of the flange. In this way, additional sealing material is provided to help compress the blunt ends 902 and improve their sealing, and also to help seal the junction area 802, which in previous designs of grid couplings has been prone to leakage of lubricant form the internal cavity 126 and provides a path for egress of debris or aggregate into the internal cavity 126.

Figure 2:
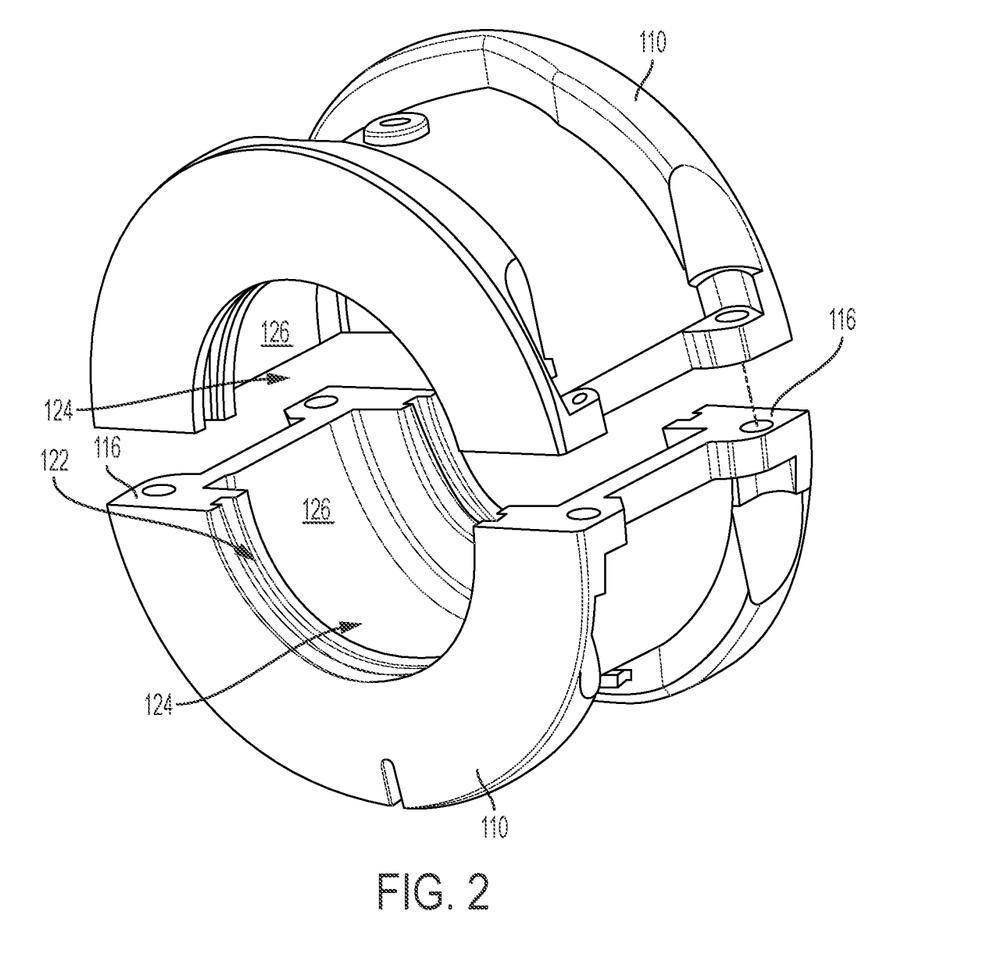
FIG. 2 is an exploded view of two housing halves for a grid coupling in accordance with the disclosure.
Figure 3:
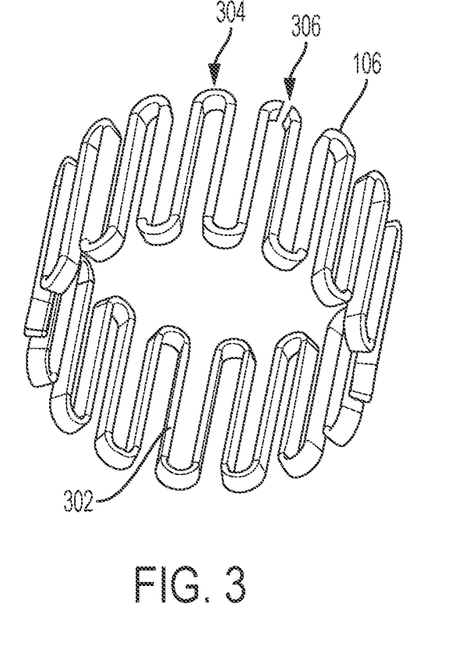
FIG. 3 is a grid spring element for a grid coupling in accordance with the disclosure.

In the illustration of FIG. 8, it can be seen that an outer thickness of the gasket 114, which is denoted as d, is smaller than an inner thickness, which is denoted as D, by a small amount, which is exaggerated in the illustrations, of about 1 or 2 thousandths of an inch (0.02-0.05 mm). Regarding the cross sectional shape of the radial seal portions 118, as shown in FIG. 9, they include a rounded rectangular shape having an outer periphery 904 that is flat, to provide a cylindrical outer face, and two radially extending faces 906 that are also flat, to provide two annularly shaped surfaces. Together, the outer periphery 904 and radially extending faces 906 engage the walls of the channels 122 (FIG. 2). An inner periphery 908 is curved in a convex direction to provide a smaller contact area and, thus, a higher contact or seal pressure, with the bearing surfaces 108 (FIG. 5) of the rotating group 102. The shape of the cross section for the radial seal portions can also be selected depending on the particular application, which may also cause a corresponding change in the shape of the channels formed in the housing. For example, the cross section of the radial seal portion can take on a circular cross section, similar to an O-ring, or another shape such as an "X" cross section, similar to quad ring seals, which can provide additional or redundant radial seal interfaces with the cylindrical bearing surfaces of the rotating group.

Figure 10:
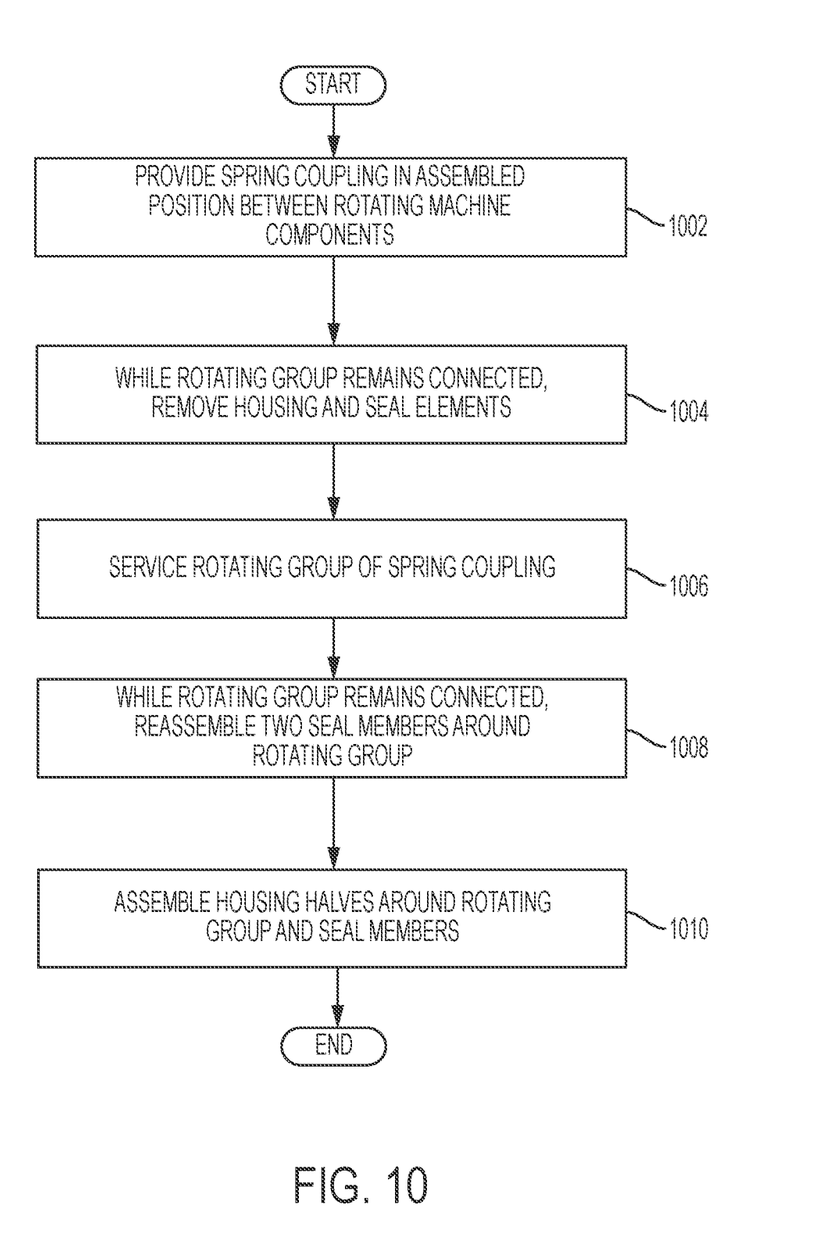
FIG. 10 is a flowchart for a method of replacing seals in a grid coupling.

A flowchart for a method of replacing seals in a grid coupling is shown in FIG. 10. The method includes providing a coupling in its assembled position between two rotating machine components at 1002. While the rotating group of the grid coupling remains connected between the rotating machine components, the housing is removed at 1004 and also two seal elements disposed between the housing halves. Each of the two seal elements includes a gasket portion disposed between flanges of the housing halves, and two radial seal portions disposed around openings at the ends of the housing between the housing and bearing surfaces of the rotating group. Following service at 1006, which may include addition of lubricant while the two hubs of the rotating group remain connected between the rotating machine components, the same or different two seal elements are reassembled around the rotating group at 1008, and the housing halves are assembled around the rotating group at 1010 such that the seal members are disposed between the two housing halves 110, which are secured to one another at 1012 to form a housing around the rotating group. In certain embodiments, the reassembly steps can be carried out in any desired order. For example, in one alternative embodiment, the seal elements may be first installed onto the housing halves, and then the housing halves, with the seals installed thereon, may be wrapped around the rotating group of the coupling to complete the assembly. Such alternative embodiment may be especially useful when the seals have been bonded onto, or have been molded directly onto, portions of the housing halves.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A grid coupling, comprising:
   two housing halves that are connectable to one another to form a housing having an internal cavity, and an opening disposed at each of a first axial end and a second axial end of the housing;
   a rotating group at least partially disposed within the internal cavity, the rotating group having two hubs rotatably engaged by a spring element to rotate about a rotational axis, each of the two hubs having a cylindrical bearing surface that extends axially along at least a portion of each of the two hubs and along the rotational axis such that, when the grid coupling is assembled, the cylindrical bearing surface extends through the opening disposed at each of the first axial end and the second axial end;
   wherein the rotating group is adapted for mechanical connection between a driver shaft and a driven shaft to transfer rotational motion between the driver and driven shafts;

wherein each of the two housing halves is generally saddle shaped and includes two flanges that are coplanar along a plane that extends parallel to the rotational axis from the first axial end to the second axial end, wherein the two housing halves are connected to form the housing at the two flanges, wherein each of the two housing halves further includes a channel disposed at each of the first axial end and the second axial end, the channel extending peripherally around the opening at each of the first axial end and the second axial end, the channel being oriented perpendicularly to the rotational axis, and two combined seal members, each of the two combined seal members comprising:
  at least one gasket seal portion, and
  at least one radial seal portion;
  wherein each of the two combined seal members includes two gasket seal portions that sealably engage both of the two flanges of one of the two housing halves, and two radial seal portions, each of the two radial seal portions having a semicircular shape, and wherein each of the two combined seal members is formed as an integral structure from an elastomeric material; and
  wherein, when the grid coupling is assembled, each of the two combined seal members is configured to be insertable around the rotating group while the rotating group remains connected between the driver and driven shafts and the housing is removed, such that, when the two housing halves are assembled around the rotating group with the two combined seal members, the internal cavity is sealed by at least one gasket seal portion from one of the two combined seals is disposed in sealing relation between two opposed flanges, and the at least one radial seal portion is disposed in the channel in sealing and sliding relation between the channel and the cylindrical bearing surface.

2. The grid coupling of claim 1, wherein each of the two gasket seal portions is formed by overmolding the elastomeric material onto a substrate.

3. The grid coupling of claim 1, wherein each gasket seal portion is disposed in sealing relation between a flange and a gasket seal portion of the other of the two combined seal members when the grid coupling is in an assembled condition.

4. The grid coupling of claim 1, wherein each of the two gasket seal portions has an inner end and an outer end, the inner end being closer to the rotational axis than the outer end, and wherein a thickness of each gasket seal portion along at least a part of the inner end is larger than a thickness of each gasket seal portion along the outer end.

5. The grid coupling of claim 4, wherein each radial seal portion has a cross sectional shape that is flat on an outer periphery and convex on an inner periphery thereof.

6. The grid coupling of claim 1, wherein each gasket seal portion is flat along a plane that is parallel to the rotational axis of the grid coupling, the gasket seal portion being configured to provide a mechanical face seal between opposing flanges formed on the two housing halves, the gasket seal portion having an inner end, which is closer to the rotational axis than an outer end, and first and second axial ends; and
  wherein the two radial seal portions extend in parallel to one another and along respective planes that are perpendicular to the rotational axis.

7. The grid coupling of claim 6, wherein the gasket seal portion is formed by overmolding the elastomeric material onto a substrate.

8. The grid coupling of claim 6, wherein each gasket seal portion is disposed in sealing relation between a flange and a gasket seal portion of a second combined seal member when the grid coupling is in an assembled condition.

9. The grid coupling of claim 6, wherein a thickness of the gasket seal portion along at least a part of the inner end is larger than a thickness of the gasket seal portion along the outer end.

10. The grid coupling of claim 6, wherein each of the two radial seal portions has a cross sectional shape that is flat on an outer periphery and convex on an inner periphery thereof.

* * * * *